United States Patent
Huang et al.

(10) Patent No.: US 9,918,296 B2
(45) Date of Patent: Mar. 13, 2018

(54) METHOD AND DEVICE FOR POSITIONING

(71) Applicant: EMC IP Holding Company LLC, Hopkinton, MA (US)

(72) Inventors: Yechen Huang, Shanghai (CN); Patrick Minggang Lu, Shanghai (CN); Chao Chen, Shanghai (CN); Jerry Yong Yang, Shanghai (CN); Guifeng Tang, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/461,461

(22) Filed: Mar. 16, 2017

(65) Prior Publication Data
US 2017/0273048 A1 Sep. 21, 2017

(30) Foreign Application Priority Data
Mar. 16, 2016 (CN) .......................... 2016 1 0149678

(51) Int. Cl.
*H04W 24/00* (2009.01)
*H04W 64/00* (2009.01)
*G01C 21/20* (2006.01)

(52) U.S. Cl.
CPC ........ *H04W 64/003* (2013.01); *G01C 21/206* (2013.01)

(58) Field of Classification Search
CPC .................................................. H04W 64/003
USPC ...................................................... 455/456.1
See application file for complete search history.

(56) References Cited

U.S. PATENT DOCUMENTS

2014/0155059 A1* 6/2014 Smith ..................... H04W 4/06
455/426.1

\* cited by examiner

*Primary Examiner* — Joel Ajayi
(74) *Attorney, Agent, or Firm* — Krishnendu Gupta; Konrad R. Lee (57) ABSTRACT

Embodiments of the present disclosure disclose a method of positioning and a corresponding portable device. In one embodiment, a method of positioning is provided. The method comprises: capturing, by image capturing equipment of a portable device, a visually encoded to in an environment; decoding the visually encoded tag to obtain an identification for generating the visually encoded tag; and determining a location of the portable device in the environment by querying a predefined library using the identification, the library recording correspondences between a set of identifications for generating visually encoded tags and a set of locations in the environment.

15 Claims, 6 Drawing Sheets

METHOD AND DEVICE FOR POSITIONING

RELATED APPLICATIONS

This application claim priority from Chinese Patent Application Number CN201610149678.5, filed on Mar. 16, 2016 at the State Intellectual Property Office, China, titled "METHOD AND DEVICE OF POSITIONING," the contents of which is herein incorporated by reference in its entirety.

FIELD

Embodiments of the present disclosure generally relate to the technical field of positioning, and more specifically, to a method of positioning and a corresponding portable device.

BACKGROUND

A location-based service such as navigation has become a prevalent novel application. In the location-based service, location of a target object needs to be obtained. In an outdoor environment, location information may be obtained by means of a global navigation satellite system (GNSS). Examples of GNSS include a global positioning system (GPS), a Galileo positioning system, and a Beidou satellite positioning system (BDS), and the like. In an indoor environment, the satellite positioning systems usually may not work, and therefore various Indoor Positioning Systems (IPSs) may be used to obtain locations.

In an approach of IPS positioning, the positioning is usually implemented based on communications between a radio beacon transmitter and a terminal device in a wireless communication network. A cellular communication network, such as a 3G/4G mobile communication network and a general packet radio services (GPRS) network, and a computer network, such as a wireless fidelity (Wi-Fi) network, may all be used for indoor positioning.

SUMMARY

In general, embodiments of the present disclosure provide a method of positioning and a corresponding portable device.

According to a first aspect of the present disclosure, there is provided a method of positioning. The method comprises: capturing, by image capturing equipment of a portable device, a visually encoded tag in an environment; decoding the visually encoded tag to obtain an identification for generating the visually encoded tag; and determining a location of the portable device in the environment by querying a predefined library using the identification, the library recording correspondences between a set of identifications for generating visually encoded tags and a set of locations in the environment.

According to a second, aspect of the present disclosure, there is provided a portable device. The portable device comprises: image capturing equipment configured to capture a visually encoded tag in an environment; and a controller configured to decode the visually encoded tag to obtain an identification for generating the visually encoded tag; and determine a location of the portable device in the environment by querying a predefined library using the identification, the library recording correspondences between a set of identifications for generating visually encoded tags and a set of locations in the environment.

According to a third aspect of the present disclosure, there is, provided a computer program product. The computer program product is tangibly stored on a non-transient compute readable storage medium and includes machine-executable instructions which, when executed, causes a machine to perform steps of the method according to the first aspect of the present disclosure.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the following detailed description with reference to the accompanying drawings, the above and other features, advantages, and aspects of embodiments of the present disclosure will become more apparent. In the accompanying drawings, same or similar reference numerals represent same or similar elements, in which.

In all of the accompanying drawings, same or similar reference numerals represent same or similar elements.

DETAILED DESCRIPTION OF EMBODIMENTS

Hereinafter, embodiments of the present disclosure will be described in more details with reference to the accompanying drawings. Although some embodiments of the present disclosure are illustrated in the drawings, it is to be understood that the present disclosure may be implemented through various forms, but may not be interpreted as being limited to the embodiments illustrated herein. On the contrary, these embodiments are only intended for a more thorough and complete understand of the present disclosure. It is to be understood that the accompanying drawings and embodiments of the present disclosure are only for the purpose of illustration, without suggesting any limitation of the protection scope of the present disclosure.

As used herein, the term "comprises," "includes" and their variants are to be read as open terms that mean "includes, but is not limited to." The term "based on" is to be read as "based at least in part on." The term "one embodiment" may be read as "at least one embodiment." The term "another embodiment" may be read as "at least one other embodiment." Relevant definitions of other terms will be provided below.

As described above, a conventional IPS technology relies on wireless communication systems. For example, a user may use a carried terminal communication device to establish a connection with a nearby base station in the mobile communication network. Then, a location of the user may be detected based on a location of the base station. However, the IPS technology based on wireless communication technologies have high requirements for the followings: environments, terminal devices, network infrastructures, and the like. For example, in an area of the wireless communication network where weak signals or strong signal interferences exist, positioning accuracy may be greatly affected. As another example, in an area where no wireless communication network is deployed, or in the case that user equipment has no function of wireless communications, the positioning even cannot be performed. In practice, under considerations of network security and the like, the terminal device may not communication with the network even if the terminal device has the function of wireless communications. Moreover, the conventional positioning technology possibly causes issues of security anchor privacy. For example, in some environments, the communications between the terminal device and devices at the network side may possibly incur malicious attacks to the network. On the other hand, the conventional positioning technology inevitably exposes location information of a user to a server side, thereby rendering the privacy issues.

In order to solve these and other potential problems, embodiments of the present disclosure provide a positioning method based on a visually encoded tag. The method also captures a visually encoded tag in an environment by means of image capturing equipment of a portable device. Correspondences between visually encoded tags and locations in the environment are determined and stored in advance. Therefore, a location of the portable device in the environment may be determined based on the visually encoded tag that has been captured. This positioning approach may abandon the reliance on the satellite and networks, thereby solving the problems existing in the conventional positioning approach based on the satellite and networks. Moreover, the positioning method based on the visually encoded tag as provided by the present disclosure is effective, simple, and feasible.

Figure 1:
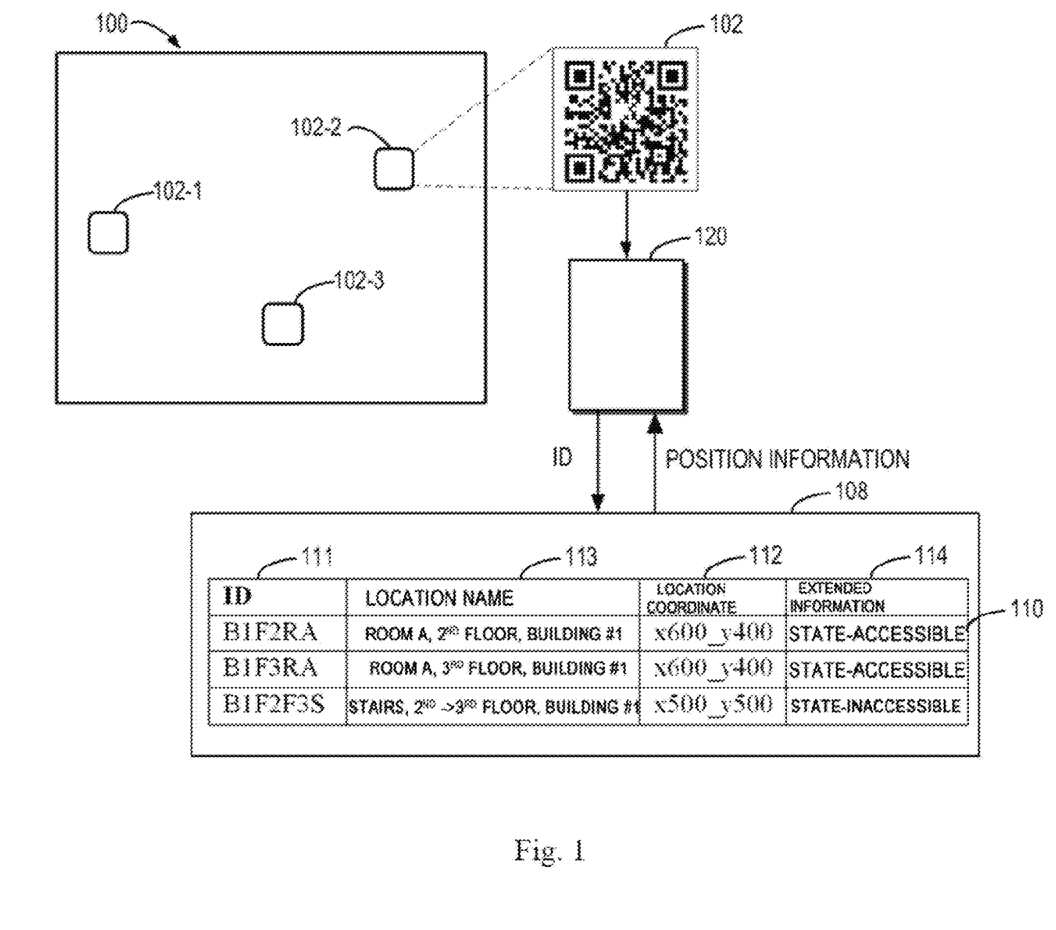
FIG. 1 shows an example environment in which embodiments of the present disclosure may be implemented.

Reference is first made to FIG. 1, which shows an example environment 100 in which embodiments of the present disclosure may be implemented. The environment 100 may be an indoor or outdoor environment. FIG. 1 shows a plan map of the environment 100. However, it is to be understood that this is only for the purpose of illustration. In other embodiments, a three-dimensional map may be used to represent a spatial structure of the environment 100.

As shown, according to the embodiments of the present disclosure, one or more visually encoded tags 102-1, 102-2, and 102-3 (collectively referred to as a visually encoded tag 102) are arranged in the environment 100. The term "visually encoded tag" used herein refers to any tag that may encode information in a visualization approach. Examples of the visually encoded tag include, but not limited to: a quick response (QR) code or a two-dimensional code, a bar code, and the like. For the purpose of discussions, the QR code will be taken as an example of a visually encoded tag in the description below.

The visually encoded tag may be arranged in one or more positions in the environment 100 in any suitable approach. In some embodiments, the visually encoded tag may be arranged on a wall and/or object in the environment 100, for example. In addition, it is to be understood that although FIG. 1 shows only three visually encoded tags 102, it is only for the purpose of illustration, without suggesting any limitation. Any suitable number of visually encoded tags may be arranged in the environment 100 according to practical needs.

According to embodiments of the present disclosure, there is a predetermined correspondence between each visually encoded tag and its location in the environment 100. Such a correspondence may be stored in a library 108. The visually encoded tag may be generated by an identification (ID) that uniquely identifies the corresponding location. For example, it is known that each two-dimensional code may be generated from a specific identification that may include numbers, alphabets, symbols, or a combination thereof. According to embodiments of the present disclosure, this identification is used to uniquely identify the location corresponding to the visually encoded tag.

As shown, correspondences between identifications for generating visually encoded tags and a set of locations in the environment 100 are stored in the library 108 in a form of a table 110. In this example, a column 111 of the table 110 stores the identifications of visually encoded tags. A column 112 of the table 110 stores the locations corresponding to the visually encoded tags in the environment 100. In this example, the location represented by a two-dimensional coordinate on the map, it is to be understood that the three-dimensional coordinate is also possible, which will be detailed in the following paragraphs.

In the example as shown in FIG. 1, the table 110 also comprises a column 113 that stores names of the locations corresponding to the individual visually encoded tags. In addition, the column 114 stores extended information for indicating whether a corresponding location is accessible. It is to be understood that the columns of the location names and the extended information are optional. In some embodiments, it may identify only the coordinates of the locations without the names thereof, and it may not identify accessibilities of the locations. This will be described in detail in the following paragraphs.

It is to be understood that the table 110 as shown in FIG. 1 is only illustrative, without suggesting any limitation of the scope of the present disclosure. In an alternative embodiment, the correspondences between the visually encoded tags and the locations may be stored in other forms, for example. As another example, the table 110 may include any additional or alternative columns to store relevant information.

In operations, the user may capture a visually encoded tag in the environment using his/her portable device 120. The portable device 120 may be any device carried by the user that has an image capturing function. Examples of the portable device 120 include, but are not limited to: a handheld device, such as a telephone, a tablet computer, a digital camera, and the like, and a wearable device, such as smart glasses, a smart watch, and the like. The portable device 120 is equipped with the image capturing equipment, such as a camera, a video camera, and the like, that is capable of capturing an image or video of the visually encoded tag.

Figure 2:
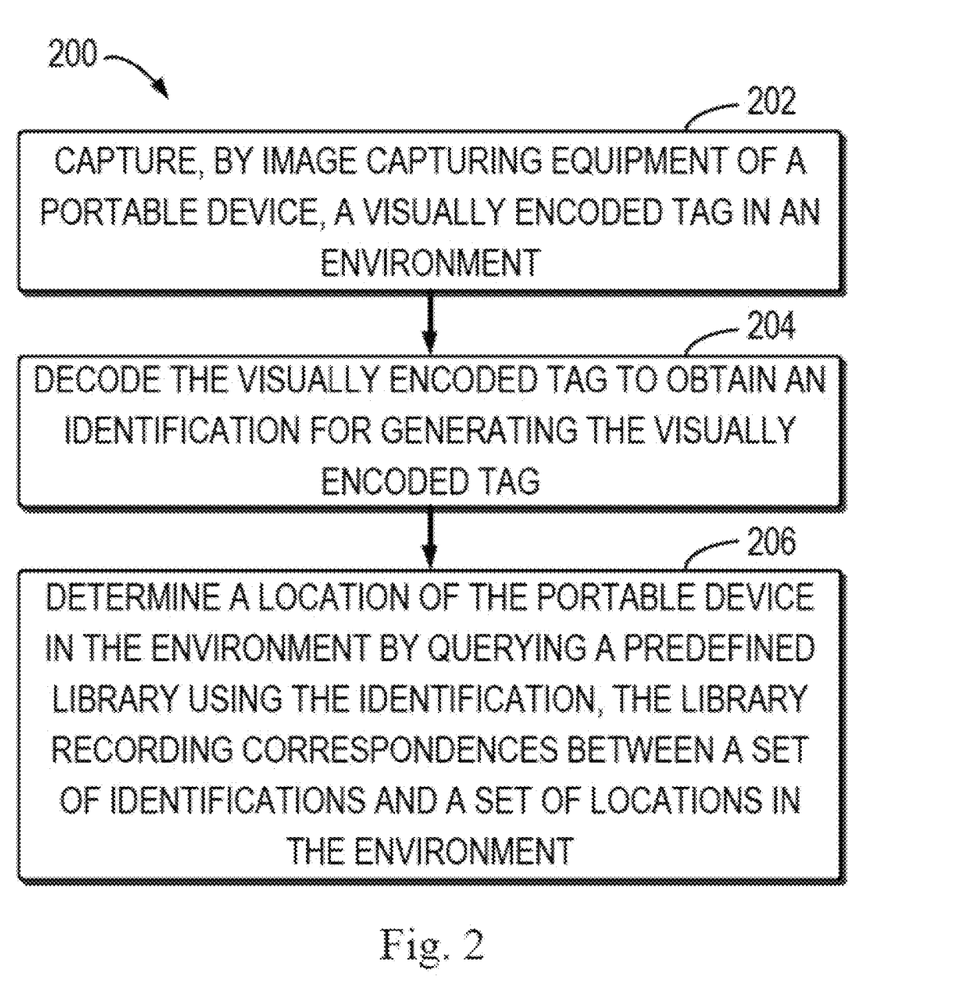
FIG. 2 shows a flow chart of a method of positioning according to some embodiments of the present disclosure.

According to embodiments of the present disclosure, after the user uses the portable device 120 to capture the visually encoded tag (for example, the tag 102) in the environment 100, the portable device 120 may decode the captured image of the tag, so as to obtain an ID for generating the visually encoded tag 102. The decoding technology for visual code such as a two-dimensional code is known in the art, which will not be detailed here. The ID of the tag obtained through the decoding may be used to query the library 108 to determine a current location of the portable device 120. A positioning process will be described in detail below with reference to a method 200 as shown in FIG. 2. The method 200 as shown in FIG. 2 may be implemented by the portable device 120.

In step 202, the visually encoded tag 102 in the environment 100 is captured by the image capturing equipment in the portable device 120. Then, in step 204, the portable device 120 decodes the visually encoded tag 102 that is captured, so as to obtain an identification (ID) of the visually encoded tag. As described above, the visually encoded tag 102 may be generated using the ID that uniquely identifies a corresponding location in the environment 100, and the visually encoded tag 102 may be a tag, such as a two-dimensional code like QR code, a bar code, and the like, that encodes information in a visualization approach. Accordingly, the visually encoded tag may be decoded by employing any suitable decoding technology that currently exists or will be developed in the further, so as to obtain the ID for generating the visually encoded tag.

Next, in step 206, a location of the portable device 120 in the environment 100 is determined by querying the predetermined library 108 using the ID obtained through the decoding. As described above, the library 108 records a correspondence between the ID and the corresponding location in the environment 100. A position where the portable device 120 is currently located may be determined by querying the library 108 using the ID corresponding to the tag captured by the portable device. In some embodiments, a coordinate of the position where the portable device 120 is located may be obtained from the library 108, for example. In particular, the coordinate recorded in the library 108 may be a three-dimensional coordinate having a height dimension. In this way, information on the three-dimensional location of the portable device 120 in the environment 100 may be obtained by querying the library 108.

In some embodiments, the library 108 may be stored in the portable device 120. In these embodiments, after obtaining the ID for generating the visually encoded tag 102 by means of the decoding, the portable device 120 may directly query the library 108 locally, and obtain, from the library 108, information indicating the corresponding location. In these embodiments, the positioning may be implemented quickly in an "offline" approach, thereby getting rid of the reliance on, for example, the communication network infrastructures and avoiding potential security risks.

Of course, it is to be understood that the library 108 is not necessarily stored locally in the portable device 120. In some other embodiments, the library 108 may be stored in a server (not shown) independent of the portable device 120. At this point, the portable device 120 may transmit the ID obtained through decoding to the server over the network. The server queries the focally stored library 108 using the ID, and then transmits to the portable device 120 the obtained information indicating the location to the portable device 120. This approach of storing the library 108 in a remote server may effectively save storage resources of the portable device 120.

The method 200 of positioning as described above with reference to FIG. 2 may be applied to any suitable location-based service. In the case of a navigation service as an example, a destination location may be determined, and then the navigation information for moving from the current location to the destination location may be presented on the portable device 120. A specific example will be described below with reference to FIGS. 3a-3d, which show an example process of navigation for a user in the environment 100 according to some embodiments of the present disclosure. In this example, the environment 100 is indoor and presented in a three-dimensional form.

Figure 3A:
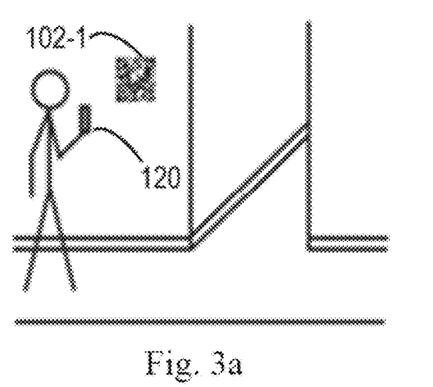
FIGS. 3a-3d show example procedures of navigation for a user according to some embodiments of the present disclosure.

As shown in FIG. 3a, when the user moves to the position where the visually encoded tag 102-1 is located, the user may use the image capturing equipment of a carried portable device 120 (for example, a camera on a smart phone) to capture the visually encoded tag 102. In this example, the visually encoded tag 102 is a QR code pasted on a wall. After the user scans the QR code using the image capturing equipment (for example, the camera) of the portable device 120, the portable device 120 decodes the QR code to obtain an ID for generating the OR code. Next, by querying a locally or remotely stored library 108 using the ID, the portable device 120 may determine the user's current location.

After determining the user's location, the portable device 120 may determine a destination location where the user wants to go. The location may be inputted by the user via a user interface (UI) of the portable device 120 or may be stored in advance. Therefore, the portable device 120 may present the navigation information for moving from the current location to the destination location to the user via the UI. The navigation information may include a route indication displayed on the map, an audio prompt, and the like, in one embodiment, an arrow on the map may be used to guide a moving direction for the user, for example.

In one embodiment, the current and destination locations are represented in a form of coordinates. However, the user sometimes might not be familiar with the environment 100 where he/she is located. In order to further enhance user experiences, in some embodiments, the location information may also be represented as a location name. The location name information may be obtained, for example, from the library 108, as described above. In particular, in some embodiments, the library 108 also stores information indicating whether respective locations are accessible (for example, see the column 114 of the table 110 in FIG. 1). If inaccessibility of the destination is found, the user may be presented with corresponding information or a detour suggestion.

Figure 3B:
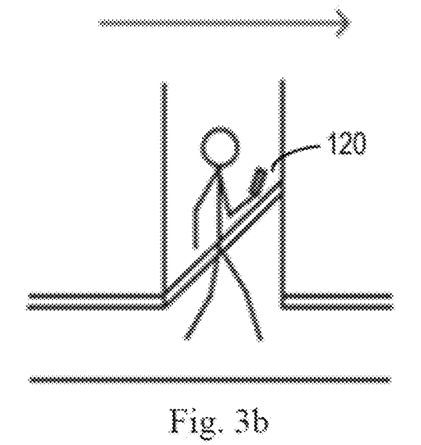
Figure 3C:
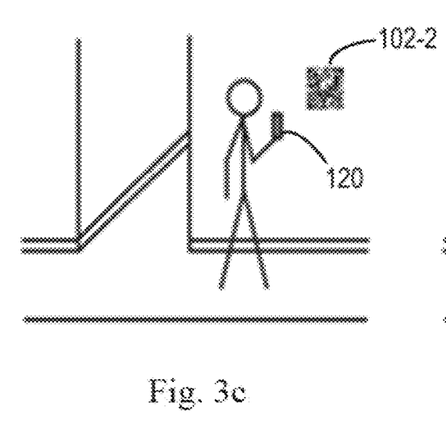
Figure 3D:
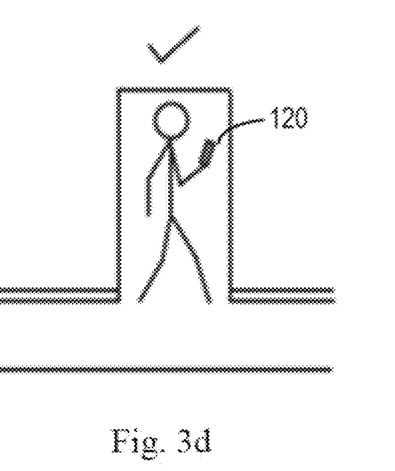

The user may move according to the direction indicated by the portable device 120, as shown in FIG. 3b. In moving, the user may continuously update locations and navigation information based on one or more other tags (for example, the visually encoded tag 102-2) in the environment 100, as shown in FIG. 3c. In this way, the user may finally arrive at the destination as shown in FIG. 3d.

Figure 4A:
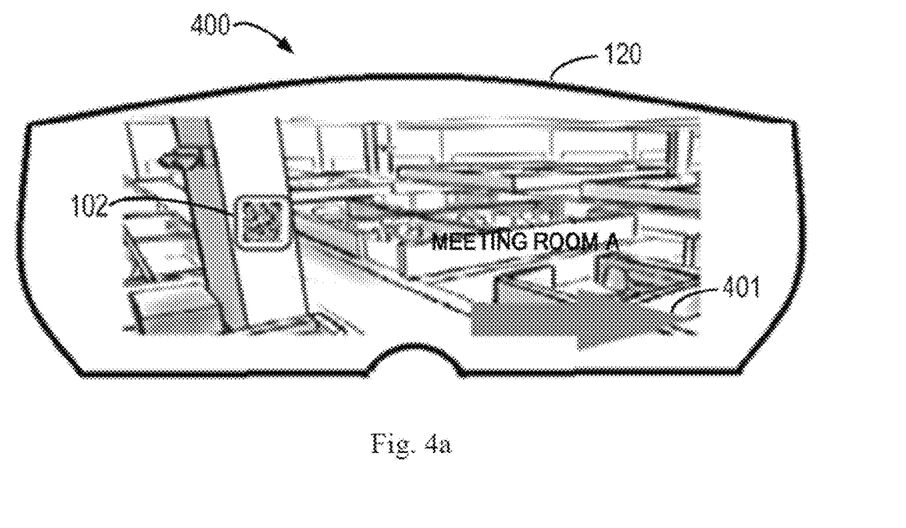
FIGS. 4a and 4b show example user interfaces of navigation for a user according to some embodiments of the present disclosure.
Figure 4B:
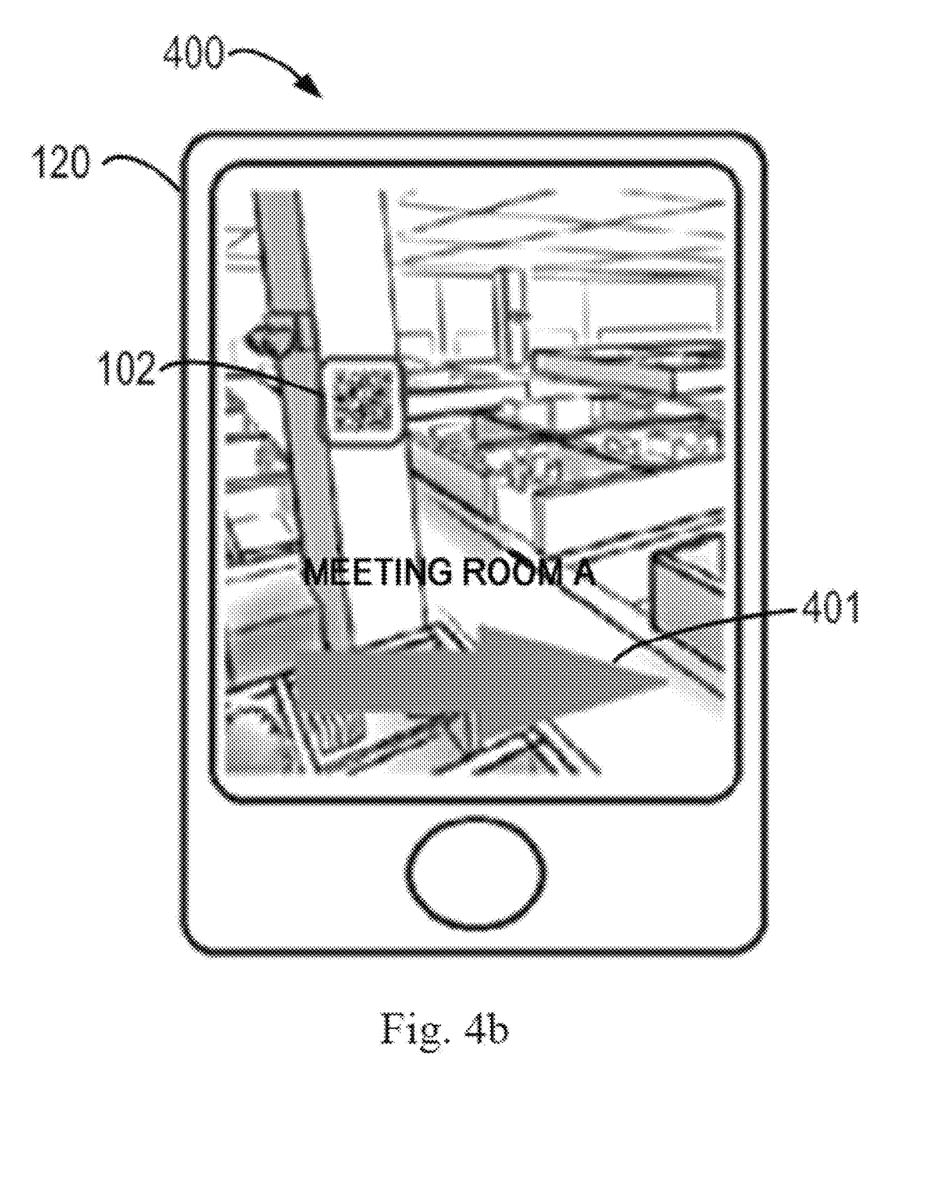

FIGS. 4a and 4b show an example user interface (UI) 400 in the above navigation process, where FIG. 4a shows navigation information presented to a user via a UI of a wearable device such as smart glasses, and FIG. 4b shows navigation information presented to a user via a UI of a portable device such as a mobile phone and a tablet computer. Specifically, in the examples as shown in FIGS. 4a and 4b, a destination address of the navigation is displayed in its name "meeting room A," and an arrow 401 is used to indicate to the user the direction in which the user should move.

Particularly, in some embodiments, in addition to the correspondences between the visually encoded tags and the locations in the environment 100, the library 108 may also record orientation information of one or more visually encoded tags 102 in the environment 100. In other words, orientations, for example, represented by "East," "West," "South," and "North," towards which the tags face in the environment 100 are determined and stored in advance. In these embodiments, in addition to determining the location of the portable device 120, its orientation in the environment 100 may also be determined.

To this end, the portable device 120 may compute an angle at which the image capturing equipment has captured the visually encoded tag 102. The angle may be detected by direction sensing equipment, such as a gravimeter, a gyroscope, an accelerometer, and the like, in the portable device 120. In practice, any sensing approaches that currently exists and will be developed in the future may be adopted to detect the angle of capturing the image, which will not be detailed here.

After determining the angle of capturing the visually encoded tag 102, the portable device 120 may obtain, from the library 108, the orientation information of the visually encoded tag in the environment. Then, the portable device 120 may determine the orientation of the portable device 120 in the environment 100 based on the angle of capturing the visually encoded tag and the orientation of the visually encoded tag 102. The orientation information may be used for a variety of purposes. In one embodiment, the orientation may be used in conjunction with the current location of the user and the destination location so as to provide accurate navigation information to the user.

Figure 5:
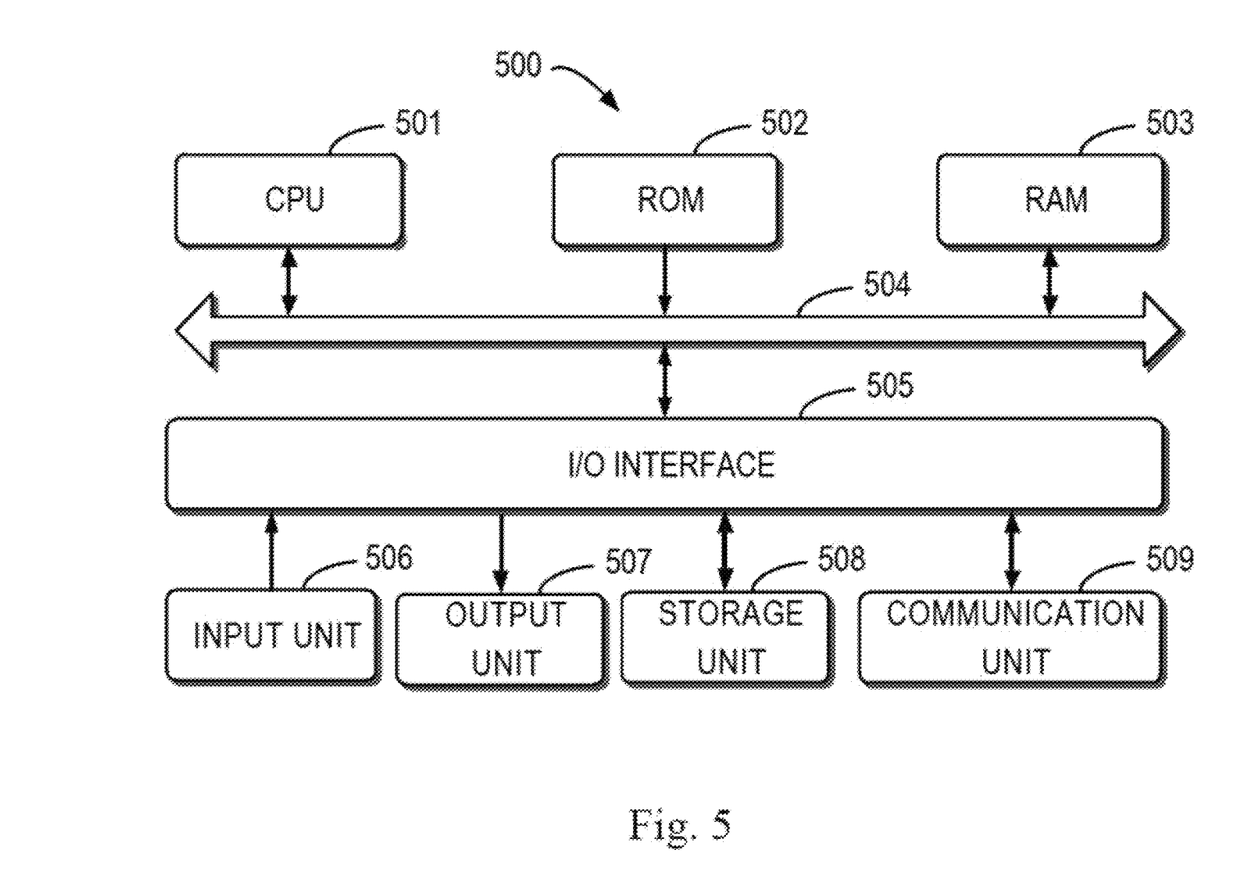
FIG. 5 shows a schematic block diagram of a portable device that may be used to implement the embodiments of the present disclosure.

FIG. 5 shows a schematic block diagram of a portable device 500 that may implement the embodiments of the present disclosure. As shown in FIG. 5, the portable device 500 includes a controller also referred to as a central processing unit (CPU) 501, which may perform various suitable actions and processing according to programs stored in a memory unit 504. The memory unit 504 includes a read-only memory (ROM) and/or a random access memory (RAM), and the memory unit 504 may also store various programs and data required for operations of the portable device 500. The CPU 501 and the memory unit 504 are connected with each other via a bus 502. An input/output (I/O) interface 503 is also connected to the bus 502.

A plurality of components in the portable device 500 are connected to the I/O 505, including: an input unit 504, such as a keyboard, a mouse, and the like; an output unit 505, such as various types of displays, a loudspeaker, and the like; a memory unit 506, such as a magnetic disk, an optical disk, and the like; and a communication unit 507, such as a network card, a modem, a wireless communication transceiver, and the like. The communicator unit 507 allows the device 500 to exchange information/data with other devices over a computer network such as Internet and/or various types of telecommunications networks. Particularly, in the embodiments of the present disclosure, the input unit 505 includes image capturing equipment for gathering, images of the visually encoded tags, for process by the CPU 501. In addition, in the embodiment where the library 108 is located in a remote server, the communication unit 507 allows the transmission of the ID of the visually encoded tag to the server and the reception of the location information from the server.

In some embodiments, the CPU 501 may be configured to perform various procedures and processing, such as the method 200, as described above. In some embodiments, the method 200 may be implemented, for example, as computer software programs that are tangibly embodied in a machine-readable medium, such as the memory unit 506. In some embodiments, a part or all of the computer programs, may be loaded into and/or installed onto the portable device 500 via the ROM and/or the communication unit 509. When the computer programs are loaded into the RAM and executed by the CPU 501, one or more steps of the method 200 as described above may be performed.

Particularly, according to the embodiments of the present disclosure, the processes described above with reference to FIGS. 1-4 may be implemented as a computer program product that may be tangibly stored on a non-transient computer readable storage medium and include machine-executable instructions which, when executed, cause a machine to implement various aspects of the present disclosure.

The computer readable storage medium nay be a tangible device that may store instructions for use by an instruction execution device. The computer readable storage medium may include, but not limited to, for example, an electronic storage device, a magnetic storage device, an optical storage device, an electromagnetic storage device, a semiconductor storage device, or any suitable combination thereof. Non-exhaustive and more specific examples of the computer readable storage medium include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination thereof. A computer readable storage medium, as used herein, is not to be construed as being transitory signals per se, such as radio waves or other electromagnetic waves propagating, freely, electromagnetic waves propagating through a waveguide or other transmission media (for example, light pulses through an optical fiber cable), or electrical signals transmitted through a wire.

Computer readable program instructions for carrying out operations of the present disclosure may be assembly instructions, instruction-set-architecture (ISA) instructions, machine instructions, machine dependent instructions, microcode, firmware instructions, state-setting data, or either source codes or object codes written in any combination of one or more programming languages, including an object oriented programming language such as Smalltalk, C++ or the like, and conventional procedural programming languages, such as a "C" programming language or similar programming languages. The computer readable program instructions may be executed entirely on a user's computer, partly on the user's computer, as a stand-alone software package, partly on the user's computer and partly on a remote computer, or entirely on the remote computer or server. In the scenario involving the remote computer, the remote computer may be connected to the user's computer over any type of networks, including a local area network (LAN) or a wide area network (WAN), or connected to an external computer (for example, through the Internet using an Internet Service Provider). In some embodiments, state information of the computer readable program instructions may be utilized to customize electronic circuitry including, for example, programmable logic circuitry, field-programmable gate arrays (FPGA), or programmable logic arrays (PLA), which may execute the computer readable program instructions, in order to implement aspects of the present disclosure.

Aspects of the present disclosure are described herein with reference to block diagrams and/or flowcharts of devices, methods, and computer program products according to embodiments of the invention. It is to be understood that each block of the block diagrams and/or flowcharts and combinations of the blocks in the flowchart illustrations and/or block diagrams and/or flowcharts may be implemented by computer readable program instructions.

The various embodiments of the present disclosure have been described for purposes of illustration, but the present disclosure is not intended to be limited to these disclosed embodiments. Without departing from essence of the present disclosure, all modifications and variations fall into a protection scope of the present disclosure as defined by the claims.

We claim:

1. A method of positioning, comprising:
   capturing, by image capturing equipment of a portable device, a visually encoded tag in an environment;
   decoding the visually encoded tag to obtain an identification for generating the visually encoded tag;
   determining a location of the portable device in the environment by querying a predefined library using the identification, the library recording correspondences between a set of identifications for generating visually encoded tags and a set of locations in the environment;
   determining a destination location from the portable device;
   presenting, on the portable device, navigation information for moving from the location of the portable device to the destination location;
   determining an angle at which the image capturing equipment has captured the visually encoded tag;
   obtaining, from the library, orientation information of the visually encoded tag in the environment; and
   determining, based on the angle and the orientation information of the visually encoded tag, an orientation of the portable device in the environment.

2. The method according to claim 1, wherein the determining comprises:
   Obtaining, based on the obtained identification and from the library, a coordinate of the location of the portable device in the environment.

3. The method according to claim 2, wherein the obtaining a coordinate comprises:
   Obtaining a three-dimensional coordinate of the location of the portable device in the environment.

4. The method according to claim 1, wherein the determining comprises:
   Querying, using the obtained identification, the library stored locally in the portable device, to obtain information indicating the location.

5. The method according to claim 1, wherein the determining comprises:
   Transmitting the obtained identification to a server independent of the portable device, the library being stored in the server; and
   receiving, from the server, information obtained from the library and indicating the location.

6. A portable device, comprising:
   image capturing equipment configured to capture a visually encoded tag in an environment; and
   a controller configured to:
      decode the visually encoded tag to obtain an identification for generating the visually encoded tag;
      determine a location of the portable device in the environment by querying a predefined library using the identification, the library recording correspondences between a set of identifications for generating visually encoded tags and a set of locations in the environment;
      determine a destination location from the portable device;
      present, on the portable device, navigation information for moving from the location of the portable device to the destination location;
      determine an angle at which the image capturing equipment has captured the visually encoded tag;
      obtain, from the library, orientation information of the visually encoded tag in the environment; and
      determine, based on the angle and the orientation information of the visually encoded tag, an orientation of the portable device in the environment.

7. The portable device according to claim 6, wherein the controller is configured to:
   Obtain, based on the obtained identification and from the library, a coordinate of the location of the portable device in the environment.

8. The portable device according to claim 7, wherein the controller is configured to:
   Obtain a three-dimensional coordinate of the location of the portable device in the environment.

9. The portable device according to claim 6, wherein the controller is configured to:
   Query, using the obtained identification, the library stored locally in the portable device, to obtain information indicating the location.

10. The portable device according to claim 6, wherein the controller is configured to:
    Transmit the obtained identification to a server independent of the portable device, the library being stored in the server, and
    receive, from the server, information obtained from the library and indicating the location.

11. A computer program product for facilitating positioning of a device, the computer program product comprising:
    a non-transitory computer readable medium encoded with computer-executable code, the code configured to enable the execution of:
       capturing, by image capturing equipment of a portable device, a visually encoded tag in an environment;
       decoding the visually encoded tag to obtain an identification for generating the visually encoded tag;
       determining a location of the portable device in the environment by querying a predefined library using the identification, the library recording correspondences between a set of identifications for generating visually encoded tags and a set of locations in the environment;
       determining a destination location from the portable device;
       presenting, on the portable device, navigation information for moving from the location of the portable device to the destination location;
       determine an angle at which the image capturing equipment has captured the visually encoded tag;
       obtain, from the library, orientation information of the visually encoded tag in the environment; and
       determine, based on the angle and the orientation information of the visually encoded tag, an orientation of the portable device in the environment.

12. The computer program product of claim 11, wherein the determining comprises:
    Obtaining, based on the obtained identification and from the library, a coordinate of the location of the portable device in the environment.

13. The computer program product of claim 12, wherein the obtaining a coordinate comprises:
    Obtaining a three-dimensional coordinate of the location of the portable device in the environment.

14. The computer program product of claim 11, wherein the determining comprises:
Querying, using the obtained identification, the library stored locally in the portable device, to obtain information indicating the location.

15. The computer program product of claim 11, wherein the determining comprises:
Transmitting the obtained identification to a server independent of the portable device, the library being stored in the server; and
receiving, from the server, information obtained from the library and indicating the location.

\* \* \* \* \*